Oct. 29, 1946.  W. A. RAY  2,410,183

ELECTROMAGNETIC DEVICE

Filed May 8, 1943

INVENTOR
William A. Ray
BY John Flam
ATTORNEY

Patented Oct. 29, 1946

2,410,183

UNITED STATES PATENT OFFICE 2,410,183

ELECTROMAGNETIC DEVICE

William A. Ray, Glendale, Calif., assignor to General Controls Co., a corporation Application May 8, 1943, Serial No. 486,165

1 Claim. (Cl. 175—335)

This invention relates to an electromagnet; and, more particularly, to one serving as a mechanical operator.

Since electromagnets of this type are called upon for the exertion of considerable power, they are energized conveniently from a commercial source of electrical energy, such as from alternating current distribution mains. In this way, the electromagnets can be designed to exert an attracting magnetic force capable of moving an armature or plunger strongly enough to perform the operation required, such, for instance, as the opening of a valve. Once the magnetic member (either armature or plunger) is pulled to the attracted position, the magnetic force required to hold the member is much less than that which was required to move the member to attracted position.

To create this large attracting force, a correspondingly large current flow is required; but this need be exerted only during a short interval upon energization of the magnet. For the remainder of the period of energization, the current consumption may be very materially reduced.

It is one of the objects of this invention to make it possible, in a simple manner, to reduce the current consumption of the electromagnet promptly upon completion of movement of the magnetic member to attracted position.

In order to simplify the structure of the electromagnet, it is desirable to operate it on rectified current, derived from the alternating current source. The problem of reducing chatter or hum is thus simplified; and the electromagnet has relatively greater holding force. A dry disc rectifier is a convenient instrumentality for obtaining the rectified current. However, if it be called upon to provide the heavy current required for attracting the movable magnetic armature or plunger, the rectifier structure must be quite large.

It is another object of this invention to make it possible to obtain substantially all of the advantages of rectified current operation, and yet to require a relatively small rectifier structure.

This object is accomplished by utilizing rectified current during the holding interval only; alternating current is used during the brief interval while a heavy current consumption is required for attracting the magnetic member. During this attracting period, the rate of energy consumed is high; but, since the period is very brief, such high consumption can easily be tolerated even without rectification.

It is accordingly another object of this invention to effect this mode of operation by energizing the electromagnet directly from the alternating current source, and automatically switching the electromagnet to the output side of a rectifier as soon as the plunger or armature reaches its attracted position. The electromagnet, if desired, may be provided with separate coils, respectively for using the heavy alternating current and for using the rectified current; but such separate coils are not essential, since, by appropriate arrangement, the same coil can be utilized for both phases of operation.

This invention possesses many other advantages, and has other objects which may be made more easily apparent from a consideration of one embodiment of the invention. For this purpose there is shown a form in the drawing accompanying and forming part of the present specification. The form will now be described in detail, illustrating the general principles of the invention; but it is to be understood that this detailed description is not to be taken in a limiting sense, since the scope of this invention is best defined by the appended claim.

Referring to the drawing.

Figure 1:
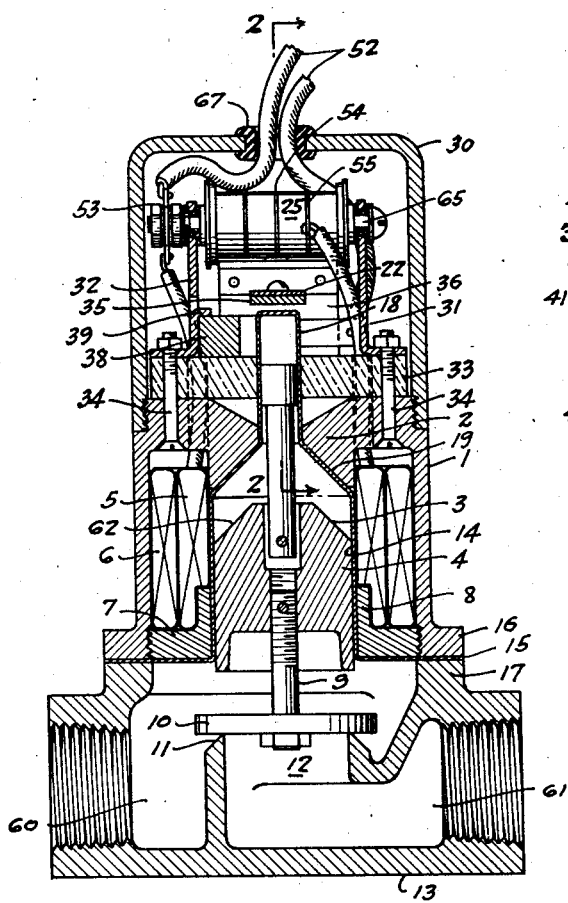
Figure 1 is a longitudinal sectional view of an electromagnet structure incorporating the invention, shown as adapted to operate a fluid control valve.

The electromagnet structure includes a magnetic circuit. One portion of this circuit is a magnetic frame 1, having an annular wall that houses many of the elements of the electromagnet. At the upper portion of the frame 1 there is located the annular pole piece 2, extending inwardly of the wall. This pole piece 2 is shown as having a tapered lower surface 19, conforming with the tapered surface 3 of a movable magnetic plunger 4.

This plunger 4 is shown as adapted to be attracted upwardly toward the pole piece 2 when the electromagnet is energized, in a manner to be described.

Energization of the electromagnet is provided by a coil structure shown, in this case, as including a pair of coils 5 and 6. These coils are disposed in the annular space between frame 1 and plunger 4. The coils may be held in place as by an apertured end plate 7, made of magnetic material. This plate 7 is threaded into the lower opening of the frame 1. It provides an annular pole piece 8 opposite the bottom of the plunger 4.

The plunger 4, in this instance, is shown as carrying a downwardly projecting valve operating stem 9. This valve stem 9 is shown as carrying a closure member 10 adapted to seat upon a valve seat 11. This valve seat 11 is disposed around a valve opening 12 that serves to establish communication between the inlet and outlet passageways 60 and 61 in the valve body 13. The valve is shown merely as one example of a device that may be operated by the electromagnet structure. Its details are, therefore, immaterial, and it is shown merely diagrammatically.

In Fig. 1, the plunger 4 is shown in its unattracted or lowermost position, the closure member 10 serving to close the valve. The plunger is shown as freely slidable in a thin non-magnetic liner sleeve 14. The upper part of the sleeve 14 is formed as a tapered shoulder fitting snugly against the pole piece 2. Liner sleeve 14 has a rather wide lateral extension 15. The sleeve is further provided with an upwardly projecting tubular extension 18. Flanges 16 and 17 are formed respectively on the frame 1 and the valve body 13. These flanges are appropriately fastened together, as by bolts. The sleeve 14 thus serves to isolate the fluid controlled by the valve closure 10 from the external atmosphere.

When the electromagnet is energized, the plunger 4 is raised; its tapered surface 3 is thus urged into contact with the inner tapered shoulder 62 of the sleeve 14.

In order to attract the plunger 4 and to lift the closure 10, a relatively large force is required; but, as soon as the plunger 4 reaches its attracted position, the force required to hold the valve open is much less than the attracting force. Accordingly, the arrangement is such that the energization of the electromagnet structure is reduced as soon as the attracted position is reached. Furthermore, the attracting force is provided by the aid of alternating current, and the holding force is obtained by the aid of a rectified direct current. Since the period of movement of the plunger 4 upwardly is very brief, upon energization of the electromagnet, the use of alternating current for this brief period renders it unnecessary to provide special features adapting the electromagnet to alternating current operation. An ordinary direct current type of electromagnet can be used.

Figure 4:
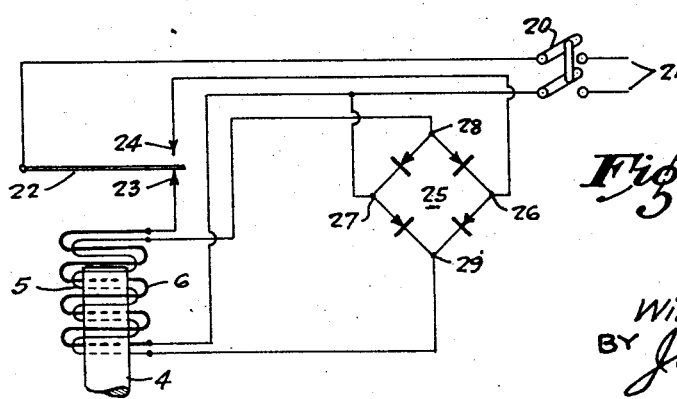
Fig. 4 is a wiring diagram illustrating the mode of operation of the electromagnet.

The wiring diagram illustrated in Fig. 4 shows, in general, the manner in which the electromagnet is operated: first, on alternating current when it is first closed, and then on rectified direct current after the plunger movement is completed. In this diagram, a circuit controlling switch 20 is illustrated connected to conventional alternating current power mains 21. When this switch 20 is open, the plunger 4 is in its lower position, as illustrated in Fig. 1. As soon as the switch 20 is closed, a circuit can be traced through the attracting coil 6. This circuit may be traced as follows: from the upper side of switch 20, a movable contact arm 22, a stationary contact point 23, coil 6, back to the lower side of the switch 20.

As soon as the plunger 4 is pulled to its attracted position, the contact arm 22 is caused to move upwardly and thereby to disconnect coil 6 from the alternating current mains. Instead, contact is now made with an upper contact point 24. This contact point completes the circuit for the holding coil 5. This circuit includes a dry disc full-wave rectifier structure 25, connected to be fed from mains 21.

Rectifier structure 25 is shown as fed with alternating current across the diagonal 26—27 when certain circuit controllers or switches are closed. Alternating current is fed to the rectifier through a circuit including the upper side of switch 20, contact arm 22, upper contact point 24, connection point 26, and point 27, at the opposite side of the diagonal, back to the lower side of switch 20. The rectified current is taken from the diagonal points 28 and 29 of the rectifier 25. These two points 28 and 29 are shown as connected to the opposite terminals, respectively, of the holding coil 5.

While the input for the rectifier 25 is open between contact arm 22 and contact point 24, the coil 5 is not energized. However, as soon as the contact arm 22 moves upwardly to disconnect the attracting coil 5, the contact 24 is rendered active, and the holding coil 5 is energized with the rectified current.

The current consumption in holding coil 5 is considerably less than in the attracting coil 6, since, as before stated, holding the plunger attracted can be accomplished with considerably less power than attracting the plunger.

Figure 2:
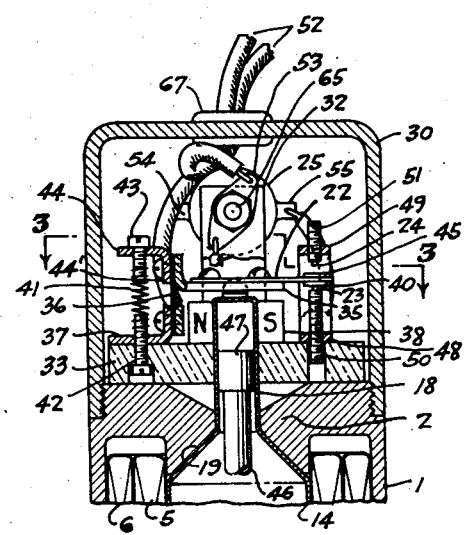
Fig. 2 is a fragmentary sectional view, taken along plane 2—2 of Fig. 1.

For this reason, the rectifier structure 25 can be made quite small, since its power output is low. In fact, the structure 25 may be disposed conveniently above the electromagnet structure and housed within a hollow cover member 30 (Figs. 1 and 2). This cover member 30 is shown as in threaded engagement with the top of the frame 1, to form a space for the accommodation of the rectifier structure 25, as well as the circuit controlling device including the arm 22 and contacts 23 and 24.

Figure 3:
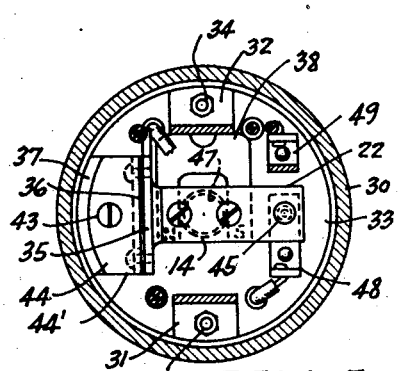
Fig. 3 is a sectional view, taken along plane 3—3 of Fig. 2.

The rectifier structure 25 is shown as supported by the aid of brackets 31 and 32 (Figs. 1, 2, and 3). These brackets are held firmly on top of an insulation block 33, disposed over the frame 1. Screws 34 extend through the top of the frame 1, as well as through the insulation block 33, and the legs of the brackets 31 and 32 serve to hold the bracket assembly together. The rectifier structure includes a central screw 65 that conveniently passes through apertures in the brackets 31 and 32, for supporting the structure. This screw may serve also as a binding post, and is therefore insulated from the brackets.

The operation of the contact arm 22, in response to the movements of plunger 4, is accomplished in a manner now to be described.

The arm 22 is shown as fastened to the top of a magnetic member 35. This magnetic member is fastened to an upright resilient leaf spring member 36. The lower end of this leaf spring 36 is shown as clamped to the upright arm of a bracket 37 carried by the insulation block 33.

Normally, the arm 22 is held in the lower position (Fig. 2) by a magnetic force influencing the member 35 and produced by a permanent magnet 38. This permanent magnet is disposed directly on top of the insulation block 33. It may be held in place by a lip 39 (Fig. 1) stamped out from the bracket 32. It is so arranged that its poles are directly underneath the magnetic arm 35. Accordingly, this magnetic arm is attracted, and the leaf spring 36 is flexed so as to bring the contact 40, carried near the free end of the arm, into engagement with the contact 23.

A tension spring 41 (Fig. 2) is provided, constantly to urge the arm upwardly; but the force of the spring is not sufficient to do this while the permanent magnet 38 is operating to attract the magnetic arm 35. The spring 41 is shown as anchored at its lower end to a screw 42 extending in an aperture in the block 33. Anchoring of the spring may be accomplished by having the lower turns of the spring in close frictional engagement with the threads of the screw 42. The upper turns of the spring 41 are in threaded engagement with a screw 43. This screw 43 is carried by the laterally extending arm 44 of a member 44', which serves as a clamp for attaching the leaf spring 36 to the magnetic arm 35. By rotation of the screw 43, the tension of the spring 41 may be adjusted, since the helical turns of this spring are in operative contact with the screw threads of the screw 43.

When the plunger 4 is in attracted position, it causes a magnetic shunt to be disposed across the poles of the permanent magnet 38. This magnetic shunt so reduces the magnetic force operating on the arm 35 that that arm and the contact arm 22 are urged by spring 41 to the upper position, in which the contact 45 is urged into contact with the stationary contact member 24.

The plunger 4 carries an upwardly extending stem 46 that supports the cylindrical magnetic shunting member 47. This shunting member is slidably movable in the tubular extension 18 of sleeve 14. When the plunger is moved upwardly, this shunting member 47 moves between the poles of the magnet 38 and the arm 35 is released.

The stationary contact members 23 and 24 are shown as carried by screws 50 and 51. These screws, in turn, are shown as adjustably threaded in brackets 48 and 49. These brackets can be appropriately mounted on top of the insulation block 33.

The connections from switch 20 (Fig. 4) to the coils 5, 6, rectifier 25, and circuit controller 22—23—24, may all be made by appropriate insulated leads. Two such leads 52 (Figs. 1 and 2) are shown as extending through an aperture in the top of cover 30. The aperture may be provided with a soft rubber insulation bushing 67.

Insulation block 33, as indicated most clearly in Figs. 1 and 3, may be apertured for the passage of the connections from the space in cover 30 to the coils 5 and 6; and the apertures (such as 66, Fig. 1) extend as well through the top wall of frame 1.

The connections for the rectifier 25 may be provided appropriately by the aid of terminal plates, such as 53, 54, 55, etc., corresponding in position to the four points 26, 27, 28, and 29 (Fig. 4) of the rectifier.

The inventor claims:

In an electromagnet structure: a magnetic circuit including a magnetic member movable to an attracted position with respect to the remainder of the magnetic circuit; an attracting coil associated with said magnetic circuit for moving said member to its attracted position when the attracting coil is energized; a holding coil associated with said magnetic circuit, for maintaining said member in its attracted position when the holding coil is energized; a dry disc full-wave rectifier structure having an input side and an output side, said output side being connected to the holding coil; a contact arm operated by the operation of the electromagnet between two positions corresponding respectively to the unattracted position and the attracted position of the member; contacts engaged by said arm respectively in said two positions; and an alternating current circuit connected by aid of the arm when the member is in the unattracted position, to energize the attracting coil, and connected by aid of the arm when the member is in attracted position to the input side of said rectifier.

WILLIAM A. RAY.